CODE CALL FACILITY FOR ELECTRONIC TELEPHONE EXCHANGE

Filed June 13, 1966 2 Sheets-Sheet 1

INVENTOR.
WILLIAM F. BARTLETT
BY [signature]
ATTORNEY

CODE CALL FACILITY FOR ELECTRONIC TELEPHONE EXCHANGE

Filed June 13, 1966 2 Sheets-Sheet 2

INVENTOR.
WILLIAM F. BARTLETT
BY [signature]
ATTORNEY

United States Patent Office 3,459,896

Patented Aug. 5, 1969

3,459,896

CODE CALL FACILITY FOR ELECTRONIC TELEPHONE EXCHANGE

William F. Bartlett, Monroe County, N.Y., assignor to Stromberg-Carlson Corporation, Rochester, N.Y., a corporation of Delaware Filed June 13, 1966, Ser. No. 557,042
Int. Cl. H04j *3/12*
U.S. Cl. 179—15 3 Claims

ABSTRACT OF THE DISCLOSURE

A code call, or paging system for a TDM telephone exchange of the kind in which the calling and called numbers are stored in separate dynamic stores. A static store is used to receive the code call signals from the called dynamic store and to control operation of the annunciator. When the paged party responds, his station number is transferred from the calling dynamic store to the static store, and thence to the called dynamic store, ending in the called dynamic store in the same time slot as occupied by the original calling number in the calling dynamic store.

This invention relates to a signal translating system for use in a telephone exchange or the like, and more particularly to a code call facility for use in a so-called electronic private exchange of the time division multiplex (TDM) type.

Code call facilities are well known, and systems have heretofore been proposed for operating such facilities through a private automatic exchange so that a code call can be initiated simply by dialing from a local station of the telephone system. See, for example, U.S. Patents Nos. 2,491,903, Pearce, and 2,717,923, Pharis.

Generally in accordance with such proposals, the person responding to the code call is connected to the calling station when he picks up any telephone in the system and dials a designated digit or series of digits.

The present invention relates to a novel circuit arrangement providing operation of a code call facility through an electronic exchange of the TDM type, and particularly of the type described and claimed in U.S. Patent No. 3,134,858, Bartlett and Brightman.

To establish a connection between two telephone stations in a system of this type, it is necessary that both stations be assigned to the same time slot in the central office, or switchboard. The system is designed to do this in the ordinary case through recognition of the calling station and of the number dialed by the calling party. With a code call facility, however, the matter is not so simple, because the call may be answered from any station in the system. When the answering party picks up a telephone, he is automatically assigned to a time slot different from the one assigned to the calling party. The problem, then, is to transfer one of the parties to the same time slot as the other.

An important feature of the present invention relates to the use of a static store, or memory for storing information that identifies one of the parties so that the information may be transferred from one time slot to another.

Figure 1:
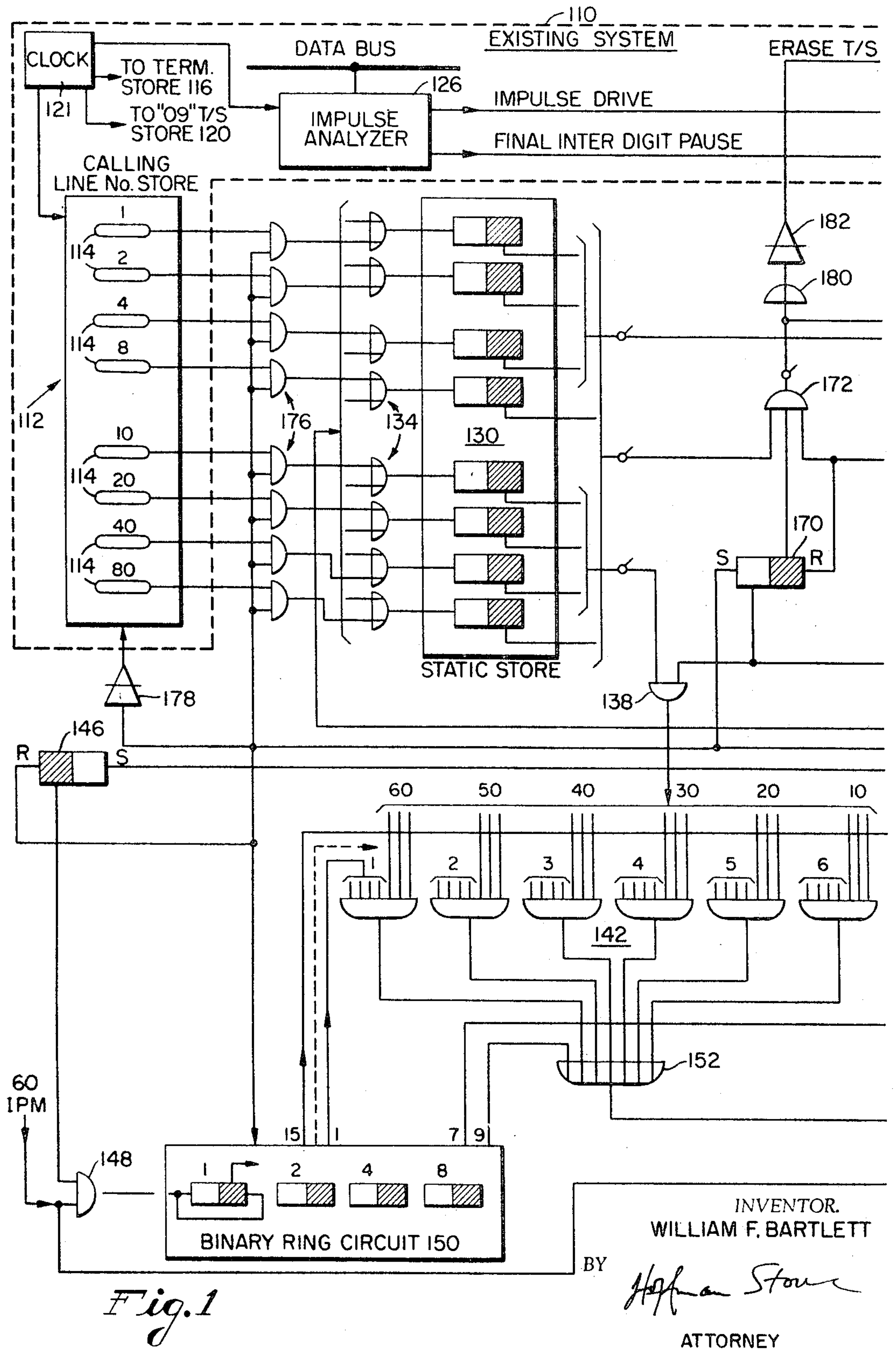
Figure 2:
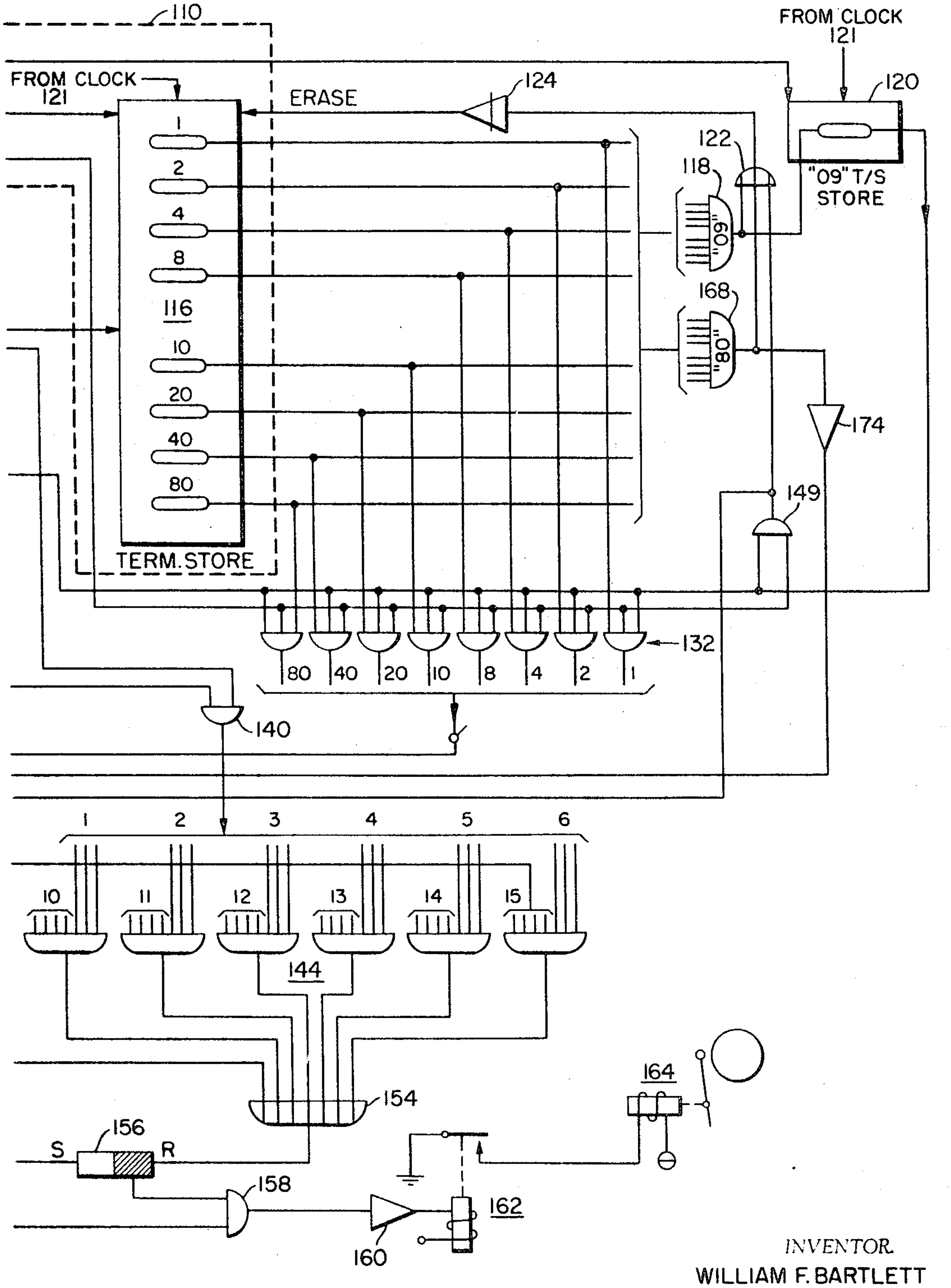

A representative embodiment of the invention will now be described in detail in connection with the accompanying drawings, wherein:

FIGURE 1 is a schematic diagram showing part of a switching circuit for a code call facility according to the invention, and FIGURE 2 is a schematic diagram of the balance of the circuit of the present embodiment. The two figures are arranged to be juxtaposed to provide a complete circuit diagram of the embodiment of the invention described herein.

That portion of the diagram included within the dashed line 110 is described in detail in the hereinabove referred to U.S. patent, and that patent may be seen for detailed information as to the overall system and the components thereof to which the circuit of the invention is connected. The present description will be directed to the parts of the circuit concerned with the code call facility, and only so much of the functions of the patented system will be described herein as is necessary to an understanding of the present invention.

The principal functions of the code call facility of the specific embodiment of the invention described herein are:

(1) Recognize a two digit code call access number.
(2) Store two digits comprising the desired call code.
(3) Produce an output signal according to the desired call code.
(4) Establish a signaling path between the called and calling parties when the former dials the code answering number.

The circuit connections can probably be best described and most easily understood by following the operation of the circuit through a typical sequence. When the calling telephone goes off hook, it is assigned to a free time slot by the usual equipment, and its line number is stored in the calling line number store 112 in the assigned time slot. The calling line number store 112 is a dynamic store comprising a series of binary coded decimal delay lines, each having a delay equal to the time frame of the system. As shown, the store 112 is arranged for a system in which each telephone line is identified by a two digit number, but provision may be made for three, four or more digits as desired and as is well understood in the art.

To gain access to the code call circuit, the calling subscriber dials the code "09." The dialed information is processed in the normal way, and the digits "09" are stored in the terminating line number store 116 in the same time slot to which the calling line is assigned. A "09" detection gate 118 recognizes the code call request and transfers the time slot assigned to the calling telephone into the "09" store 120, at the same time erasing the "09" information from the assigned time slot in the terminating line number store 116. The erasing is done by passing the output of the "09" gate through an OR gate 122 and an inverter 124 into the store 116. The "09" store 120 is a recirculating delay line having a delay equal to the time frame of the TDM system, and is synchronized by the system clock 121.

The calling subscriber now dials the desired two digit call code, which is stored in the terminating line number store 116, in the same time slot assigned to the calling subscriber's line. Upon recognition of the final interdigital pause by the impulse analyzer 126, the two digit call code is transferred from the terminating line number store 116 to the code call static store 130 through an array 132 of AND gates, which are connected to the outputs of the terminating line number store 116, and an array of OR gates 134, which are connected at the input of the static store 130. The AND gates 132 are enabled by the signal from the impulse analyzer 126 and the time slot signal from the "09" store 120.

The impulse analyzer 126 is part of the system described in the hereinabove identified patent, and is also described in detail in Patent No. 3,158,812. The code call static store 130 comprises two sets of binary coded decimal flip-flops, and are capable of storing information continuously for any desired time. The information now in the static store 130 is used at this point to generate the output code signal.

In the usual code call facility only thirty-six code numbers are provided for, each code number consisting of two digits, neither one of which is greater than the digit 6. Full code call information, therefore, is available in the static store 130 from the first three flip-flops assigned to the units digits taken with the first three flip-flops assigned to the tens digits. The outputs of these flip-flops are applied through respective gates 138 and 140 to respective banks 142 and 144, respectively of AND gates, partially to enable one gate in each of these two banks 142 and 144. One bank 142 of these AND gates constitutes the tens designation of the code call number, and the other bank 144 constitutes the units designation. They are arranged to convert the binary coded information from the static store 130 to decimal form so that, for example, if the static store 130 indicates the units digit 5 by having an output voltage at its flip-flops weighted 1 and 4, only the AND gate designating the unit digit 5 will be partially enabled.

At the same time as the transfer of information from the terminating line number store 116 to the code call static store 130 takes place, a counter flip-flop 146 is set, partially to enable an AND gate 148 at the input of a binary ring counter 150. The flip-flop 146 is set responsively to the signal from the impulse analyzer 126 which passes through an AND gate 149 to the flip-flop 146. The AND gate 149 is enabled by the signal from the "09" time slot store 120. The second input to the AND gate 148 is derived from an impulse generator (not shown) which provides a single signal pulse once every second, so that, so long as the flip-flop 146 is in its set condition, the binary ring counter 150 indexes one count per second.

The output of the binary ring counter 150 is applied to the two arrays 142 and 144 of AND gates, the inputs of which are arranged so that they are partially enabled responsively to the output of the binary ring counter 150 in accordance with the following sequence:

| Count from binary ring counter: | Digit designation of the gates in arrays 142 and 144 |
|---|---|
| 1 | 60 |
| 2 | 50 |
| 3 | 40 |
| 4 | 30 |
| 5 | 20 |
| 6 | 10 |
| 7, 8, 9 | None of the gates **142** and **144** respond to these numbers. |
| 10 | 1 |
| 11 | 2 |
| 12 | 3 |
| 13 | 4 |
| 14 | 5 |
| 15 | 6 |
| 16 | No gate responds. |

The arrays 142 and 144 of AND gates are connected through respective OR gates 152 and 154, respectively, to trigger an output flip-flop 156. During one of the first six counts of the binary ring counter 150, one of the AND gates in the tens array 142 becomes fully enabled, this being the one which is partially enabled both by the signal from the static store 130 and by the signal from the binary ring counter 150. At this time, the output flip-flop 156 is triggered to enable the output gate 158 to pass the pulse signal from the impulse generator to an amplifier 160, which, in turn, operates a relay 162 to actuate the call bell 164.

The bell 164 continues to ring once per second, starting with the coincidence count and continuing through count number 6. At count number 7, the binary ring counter 150 directs an output pulse through the OR gate 154 to reset the output flip-flop 156, thereby disabling the output gate 158. The gate 158 remains closed for two seconds, until the ninth count from the ring counter 150, whereupon a signal is directed through the OR gate 152, again to set the output flip-flop 156, and the bell 164 again rings once per second until one of the AND gates in the units array 144 becomes fully enabled and again resets the output flip-flop 156. The two sets of multiple signals are spaced apart by a period of two seconds, so that the person being called can readily distinguish between the units and the tens signals, each of which is composed of separate rings of the bell spaced at one second intervals.

The binary ring counter 150 continues to count, and the audible signals are repeated every sixteen seconds until a subscriber dials the code answering number, or the calling party goes back on hook.

In order to answer the code call audible signal, the called person picks up any telephone in the system and dials the code answering number "80." This call is registered in a time slot different from the time slot to which the calling party is assigned. The identity of the answering line is stored in the calling line number store 112 in this different time slot, and the answering number "80" is stored in the terminating line number store 116. The answer number "80" in the terminating line number store 116 is detected by an "80" gate 168, whereupon the following control functions take place:

(1) The answering line's identity, which is stored in the different time slot in the calling line number store 112, is transferred into the code call static store 130. This is done through a bank 176 of AND gates which are connected between the outputs of the calling line number store 112 and the OR gates 134 at the inputs of the static store 130.

(2) All information in this different time slot is erased from both the calling and the terminating line number stores 112 and 116, respectively. For the calling line number store 112, this is done by applying the output of the "80" detection gate 168 through an amplifier 174 and an inverter 178 to the inputs of the store 112. For the terminating line number store 116, the "erase" signals are taken from the "80" detection gate 168 through the OR gate 122 and the inverter 124.

(3) The binary ring counter 150 is reset to zero. This is done by the output signal from the amplifier 174, which receives its input signal from the "80" detection gate 168.

(4) The counter drive flip-flop 146 is reset by the same signal used to reset the counter 150, thus disabling the gate 148 at the input to the counter.

(5) The signal from the amplifier 174 is also applied to the transfer flip-flop 170 to set it. This disables the AND gates 138 and 140, thus disassociating the code call static store 130 from the arrays 142 and 144 of AND gates. It also directs the output of the code call static store 130 to the input of the terminating line number store 116 by enabling a bank of eight AND gates 172.

With the answering party's number now stored in the code call static store 130, and the transfer flip-flop 170 set, the output of the "09" time slot store 120, which is the time slot to which the calling party is assigned, enables the gates 172 between the static store 130 and the terminating line number store 116, thus causing the identity of the answering line to be transferred from the code call static store 130 to the terminating line number store 116. The time slot from the "09" store 120 is also applied to the reset terminal of the transfer flip-flop 170 to reset it, and the number signals from the static store are fed through a bank of OR'ed gates 180 and an inverter 182 to the "09" store to erase the calling time slot from it. The system is now in the standard condition establishing a connection between the two telephone stations. The originating party's number is stored in the calling line number store 112, still in its originally assigned time slot, and the answering party's number is now in the terminating line number store 116 in the same time slot.

To avoid confusion in the drawing, the necessary lead is not shown, but the output of the "09" time slot store 120 is preferably also fed to the impulse analyzer 126 to avoid simultaneous seizure of the code call circuit by two or more telephones in the system. Upon recognizing the presence of a time slot in the "09" store 120, the impulse analyzer 126 causes the second telephone seeking access to the circuit to be connected to a source of "busy" tone signal.

What is claimed is:

1. A code call facility for a telephone exchange of the time division multiplex type of the kind having a first dynamic store for storing signals identifying a calling party's number, and a second dynamic store for storing signals identifying the called number, said facility comprising a static store, means for identifying a first predetermined code signal, means responsive to the first predetermined code signal for transferring a called number from the second dynamic store to said static store, means responsive to said static store for actuating a transducer to produce an audible signal, means for identifying a second predetermined code signal, means responsive to the second code signal for transferring a calling party's number from the first dynamic store to said static store and from said static store to the second dynamic store.

2. A code call facility for a telephone exchange of the time division multiplex type comprising:

(a) a static store for storing decimal information in binary coded form, (b) means for detecting a code access signal in any time slot of the repetitive time frame of the exchange, (c) means for storing the identity of a time slot in which the code access signal is detected, (d) means for transferring a code call number from a dynamic store of the exchange to said static store, (e) means for producing a code call output signal in accordance with a code call number stored in said static store, (f) means for detecting a code answering signal in any time slot in the time frame of the exchange, (g) means responsive to said answering signal detecting means for transferring a signal identifying the line where the answering signal originated from a dynamic store of the exchange to said static store, and (h) means for transferring a signal from said static store to a dynamic store of the exchange in the time slot identified in said means for storing the identity of a time slot.

3. A code call facility for a telephone exchange of the time division multiplex type having a calling line number store, means for storing signals identifying a calling line in an assigned time slot in the calling line number store, a terminating line number store, and means for storing signals identifying a called line in the assigned time slot in the terminating line number store, said facility comprising:

(a) first gate means for producing a time slot signal responsively to the presence of a first predetermined code signal in any time slot in the terminating line number store, (b) a dynamic storage device for storing a signal produced by said gate means in its original position in the time frame of the exchange, (c) signal inverter means connected between said gate means and the terminating line number store for erasing the predetermined code signal from the time slot in the terminating line number store responsively to the production of the time slot signal by said gate means, (d) a static store, (e) transfer gate means for transferring signals from the terminating line number store to said static store, said transfer gate means being enabled by the time slot signal in said dynamic storage device so that the signal transferred to said static store is taken from the same time slot to which the said first gate means responded, (f) means for producing a code call output signal corresponding to the signal transferred to said static store by said transfer gate means, (g) second gate means for producing a second time slot signal responsively to the presence in any time slot in the terminating line number store of a second predetermined signal, (h) additional gate means partially enabled by said second time slot signal for transferring signals from the calling line number store to said static store, (i) means responsive to said second time slot signal for disabling said code call output signal means, (j) means responsive to said second time slot signal for erasing signals from said second time slot in the calling line number store, (k) transfer means responsive to the time slot signal stored in said dynamic storage device for transferring signals from said static store to the terminating line number store, and, (l) means effective simultaneously with said last named transfer means for erasing the time slot signal from said dynamic storage device.

References Cited

UNITED STATES PATENTS

| | | | |
|---|---|---|---|
| 3,158,688 | 11/1964 | Bartlett | 325—55 XR |
| 3,306,978 | 2/1967 | Simmons et al. | 179—15 |
| 2,957,949 | 10/1960 | James et al. | 179—18 |

ROBERT L. GRIFFIN, Primary Examiner

C. R. VON HELLENS, Assistant Examiner

U.S. Cl. X.R.

325—55